US006247028B1

(12) United States Patent
Torisaki (10) Patent No.: US 6,247,028 B1
(45) Date of Patent: Jun. 12, 2001

(54) CONTROLLING ATTRIBUTES OF PRE-REGISTERED FORM DATA TO MATCH THOSE OF DATA TO BE PRINTED WITH THE FORM DATA

(75) Inventor: Atsushi Torisaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/600,522

(22) Filed: Feb. 13, 1996

(30) Foreign Application Priority Data

Feb. 16, 1995 (JP) .................................................. 7-028182
Feb. 6, 1996 (JP) .................................................. 8-019991

(51) Int. Cl.$^7$ ...................................................... G06F 3/12
(52) U.S. Cl. ........................... 707/507; 707/505; 707/523
(58) Field of Search ................................... 395/766–769, 395/787, 789; 707/500, 505–508, 523; 345/435

(56) References Cited

U.S. PATENT DOCUMENTS

| | | | | |
|---|---|---|---|---|
| 4,665,555 | * | 5/1987 | Alker et al. ........................... | 382/305 |
| 4,823,303 | * | 4/1989 | Terasawa ............................... | 395/777 |
| 4,870,611 | * | 9/1989 | Martin et al. ......................... | 395/788 |
| 5,025,396 | * | 6/1991 | Parks et al. ........................... | 707/506 |
| 5,079,724 | * | 1/1992 | Shiraki et al. ........................ | 395/783 |
| 5,204,959 | * | 4/1993 | Sakuragi et al. ...................... | 395/139 |
| 5,208,905 | * | 5/1993 | Takakura et al. ..................... | 395/777 |
| 5,305,396 | * | 4/1994 | Betts et al. ........................... | 382/175 |
| 5,316,396 | * | 5/1994 | Fukaya .................................. | 400/76 |
| 5,420,695 | * | 5/1995 | Ohta ...................................... | 358/462 |
| 5,566,278 | * | 10/1996 | Patel et al. ............................ | 395/114 |

FOREIGN PATENT DOCUMENTS

| | | |
|---|---|---|
| 0529818 | 3/1993 | (EP) . |
| 0 703 524 A1 | * 3/1996 | (EP) . |
| 0 741 485 A1 | * 11/1996 | (EP) . |
| 93/17379 | 9/1993 | (WO) . |

OTHER PUBLICATIONS

Streeter, "OPI Helps Unclog Bottleneck for Printing High–Res Images", *MacWeek,* v. 7, No. 48, pp. 44(1), Dec. 12, 1993.*
Hannaford, "The Hocus–Pocus of OPI", *MacUser,* v. 10, No. 3, p. 125(4), Mar. 1994.*
Scaffel. et al., "Another OPinion", *MacUser,* v. 11, No. 3, p. 113, Mar. 1995.*
Brisbin, "Upgrades Ease Connections", *MacUser,* v. 11, No. 5, p. 103, May, 1995.*

* cited by examiner

Primary Examiner—Stephen S. Hong
(74) Attorney, Agent, or Firm—Fitzpatrick, Cella, Harper & Scinto (57) ABSTRACT

Upon reception of form data and related attribute data (such as resolution, paper size or the like), which are transmitted from a host computer, the received form data is transformed into intermediate data and is registered with its attribute information, in a memory of a printer apparatus. When the host computer instructs a form overlay print operation using the registered form data, a check is made as to whether the resolution or paper size (for example) of the received print data matches that of the form data designated for use in the form overlay print operation. If the two resolutions or paper sizes or the like do not match, the resolution or paper size or the like of the registered form data is converted to correspond to that of the received print data, and image data of the converted form data is synthesized with the print data, thus performing the print operation.

24 Claims, 6 Drawing Sheets

CONTROLLING ATTRIBUTES OF PRE-REGISTERED FORM DATA TO MATCH THOSE OF DATA TO BE PRINTED WITH THE FORM DATA

BACKGROUND OF THE INVENTION

The present invention relates to an output control method, apparatus, and computer program product, which can register, e.g., form overlay information, and the like, and can perform an output operation using the registered information.

Conventionally, in order to reduce the volume of data to be transferred from an external apparatus such as a host computer and to execute high-speed print processing, some print apparatuses allow registration of form overlay information, such as a standard form to be used frequently, utilizing ruled lines, characters, halftone screen, and the like of a table of, e.g., a strip. When such a print apparatus is used, the external apparatus generates only the variable data portion, transfers it to the print apparatus, and designates that print processing is to be performed using the form overlay information, thus performing the print operation using the standard form. Also, a print apparatus which can register, e.g., font data, macro data, and the like in addition to form data, and can perform a print operation using these data, is known.

Since the attributes of the registered form data, font data, macro data, and the like are not always equal to attribute information such as the resolution and number of gradation of data being printed currently or in the current print mode, the following problems are posed.

(1) When the resolution of the registered data is higher than that of current print data, since image data is formed in accordance with the resolution of the print data, the size of the registered form data undesirably increases.

(2) When the size of the registered data is larger than the paper size of print data, the print operation cannot be performed if print image data is formed by directly using the registered data.

SUMMARY OF THE INVENTION

The present invention has been made in consideration of the above situation, and has as its object to provide an output control method, a computer program product and an apparatus, which can convert registration information to be used in an output operation in correspondence with the current output attribute, and can perform the output operation using the converted information.

It is another object of the present invention to provide an output control method, apparatus, and computer program product, which can convert the resolution of registration information into that of received data, and can perform an output operation using the converted information.

It is still another object of the present invention to provide an output control, apparatus, and computer program product, which can convert the size of registration information in correspondence with that of received data, and can perform an output operation using the converted information.

It is still another object of the present invention to provide an output control method and apparatus, which can reduce the memory capacity required for storing registration information since the resolution or size of the registration information need not be registered in correspondence with the resolution or paper size of print data.

In order to achieve the above objects, an output control apparatus according to the present invention comprises the following arrangement. That is, there is provided an output control apparatus for outputting data received from an external apparatus, comprising registration means for registering registration information together with the attribute information, conversion means for, when an output operation using the registration information is instructed by the data from the external apparatus, converting the registration information in accordance with attribute information instructed by the data, and control means for controlling to execute output processing using the registration information converted by the conversion means.

In order to achieve the above objects, an output method according to the present invention comprises the following steps. That is, there is provided an output method for outputting data received from an external apparatus, comprising the steps of registering registration information together with the attribute information, converting the registration information in accordance with attribute information instructed by the data when an output operation using the registration information is instructed by the data from the external apparatus, and controlling to execute output processing using the converted registration information.

It is still another object of the present invention to provide a computer program product comprising a computer usable medium having computer readable program code means embodied in the medium for outputting data received from an external apparatus, the product including registering process procedure codes for registering registration information together with attribute information of the registration information, converting process procedure codes for converting the registration information in accordance with the attribute information instructed by data when an output operation using the registration information is instructed by the data from the external apparatus, and control process procedure codes for controlling to execute output processing using the converted registration information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE PREFERRED EMBODIMENTS

The preferred embodiments of the present invention will be described in detail below with reference to the accompanying drawings.

[First Embodiment]

Figure 1:
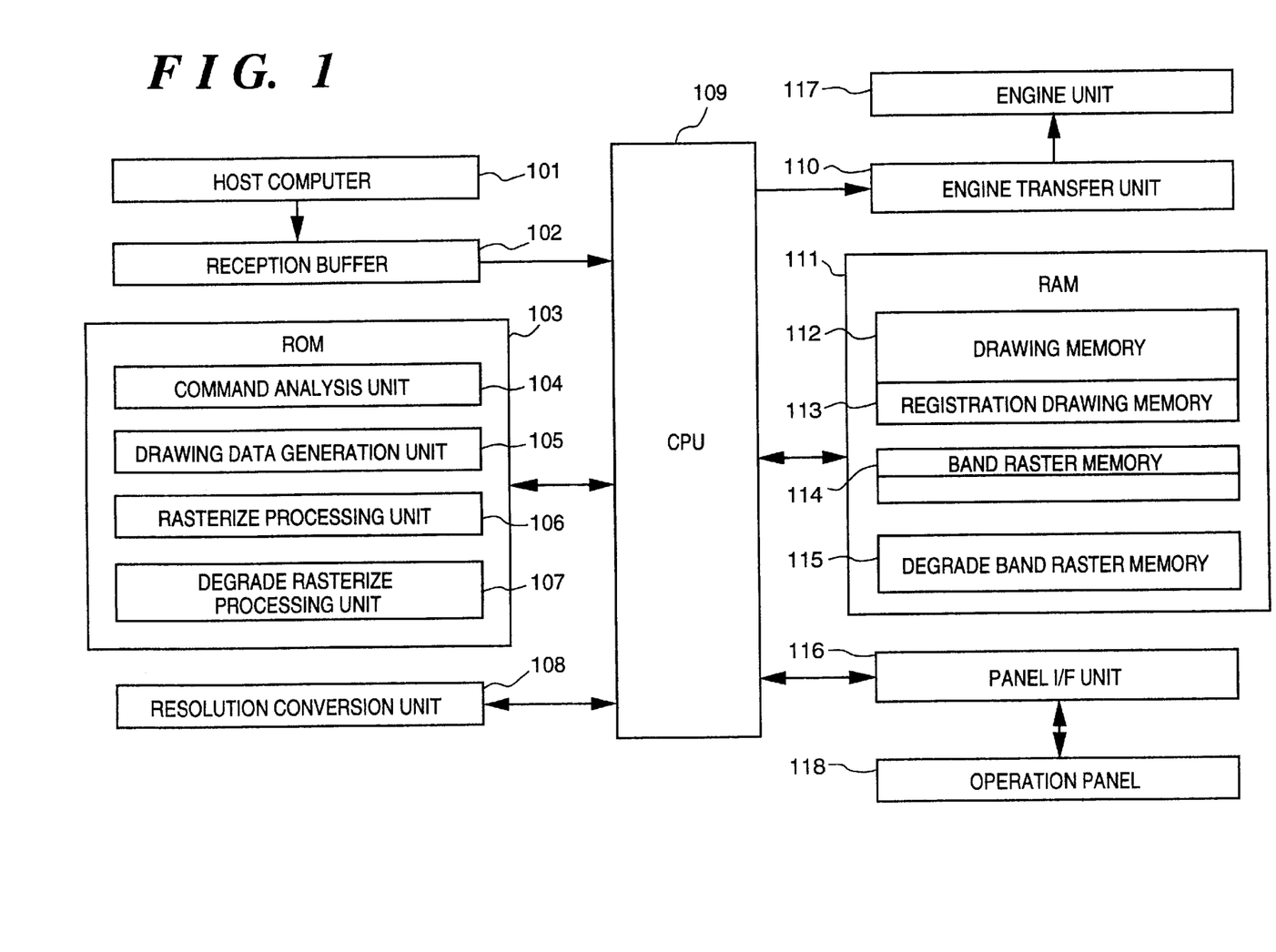
FIG. 1 is a block diagram showing the arrangement of a controller of a laser beam printer according to the first embodiment of the present invention.

FIG. 1 is a block diagram showing the arrangement of a controller of a laser beam printer according to an embodiment of the present invention.

Referring to FIG. 1, reference numeral 101 denotes a host computer, which transfers print data and various other data to a laser beam printer of this embodiment and controls the printer to perform a print operation. Reference numeral 102 denotes a reception buffer of the laser beam printer, which buffer temporarily stores reception data such as commands, data (received data), and the like received from the host computer 101. Reference numeral 103 denotes a ROM which stores programs (104 to 107) for realizing a series of control operations shown in the flow charts of FIGS. 2 and 3 (to be described later), and various data such as font data.

Reference numeral 104 denotes a command analysis unit for analyzing a command which is included in input data received from the host computer 101 and is stored in the reception buffer 102. Reference numeral 105 denotes a drawing data generation unit, which generates a drawing object (intermediate data) on the basis of the input data temporarily stored in the reception buffer 102, and stores it in a drawing memory 112 of a RAM 111. Reference numeral 106 denotes a rasterize processing unit for rasterizing the drawing object (intermediate data) stored in the drawing memory 112 to generate image data, and storing the image data in a band raster memory 114 of the RAM 111 in units of bands. Reference numeral 107 denotes a rasterize processing unit for a resolution conversion (degrade) mode, which rasterizes the resolution-converted drawing object (intermediate data) stored in the drawing memory 112 to form image data, and stores the image data in a degrade band raster memory 115 in units of bands. Reference numeral 108 denotes a resolution conversion unit for converting the resolution of a drawing object when the drawing object is generated by the drawing data generation unit 105. The drawing object (intermediate data) is processed data of input data, such as PDL data, in order to be easy to form image data from the input data.

Reference numeral 109 denotes a CPU for controlling the entire laser beam printer of this embodiment in accordance with various control programs stored in the ROM 103. Reference numeral 110 denotes an engine transfer unit for outputting image data in the raster format to an engine unit 117 of the printer. Reference numeral 111 denotes a RAM having memory areas 112 to 115. Reference numeral 112 denotes a drawing memory for storing a drawing object generated by the above-mentioned drawing data generation unit 105. Reference numeral 113 denotes a registration drawing memory which is used for registering intermediate data such as form data, font data, macro data, or the like, and stores a drawing object of registration data generated by the drawing data generation unit 105. Reference numeral 114 denotes a band raster memory for storing the rasterized image data. Reference numeral 115 denotes a degrade band raster memory for storing the resolution-converted image data. Reference numeral 116 denotes a panel interface (i/f) unit for attaining interfacing with an operation panel 118. In this embodiment, the engine unit 117 corresponds to a printer engine unit for performing a print operation by the electrophotography method. However, the present invention is not limited to this. For example, an engine unit which performs a print operation by an inkjet method, a thermal method, a thermal transfer method, or the like may be used. The operation panel 118 comprises various keys operated by an operator, and a display such as a liquid crystal display for displaying messages, and the like.

Registration processing of form data and the drawing operation based on the data in the laser beam printer of this embodiment with the arrangement shown in FIG. 1 will be described below with reference to the flow charts in FIGS. 2 and 3.

Figure 2:
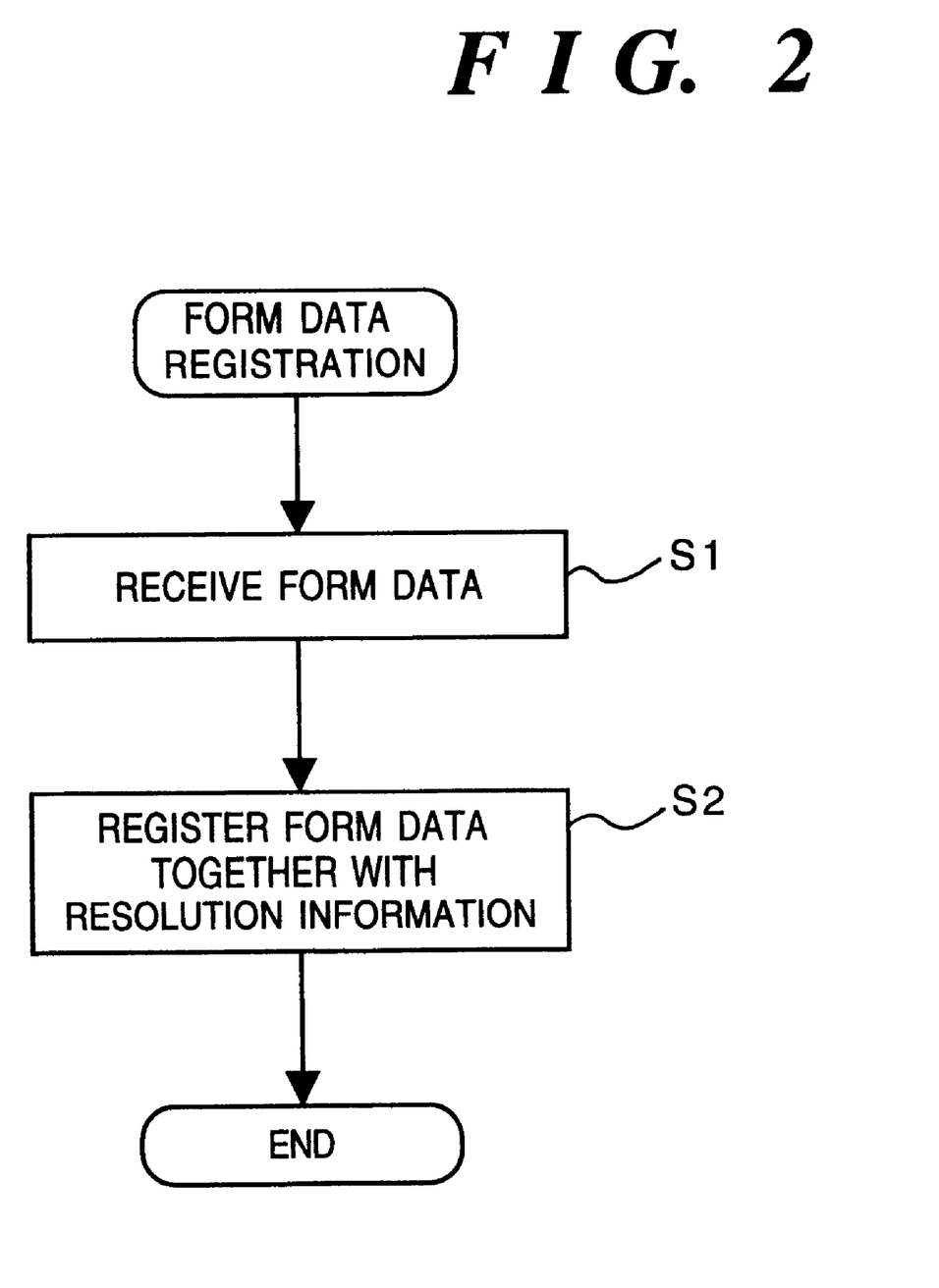
FIG. 2 is a flow chart showing the processing for registering form data from a host computer to a printer apparatus of the first embodiment.

FIG. 2 is a flow chart showing the registration processing of form data transmitted from the host computer 101 to the printer apparatus of this embodiment.

Upon reception of form data in step S1, the flow advances to step S2, and the form data received from the host computer 101 is transformed into intermediate data and registered in the registration drawing memory 113 together with its resolution information.

Figure 3:
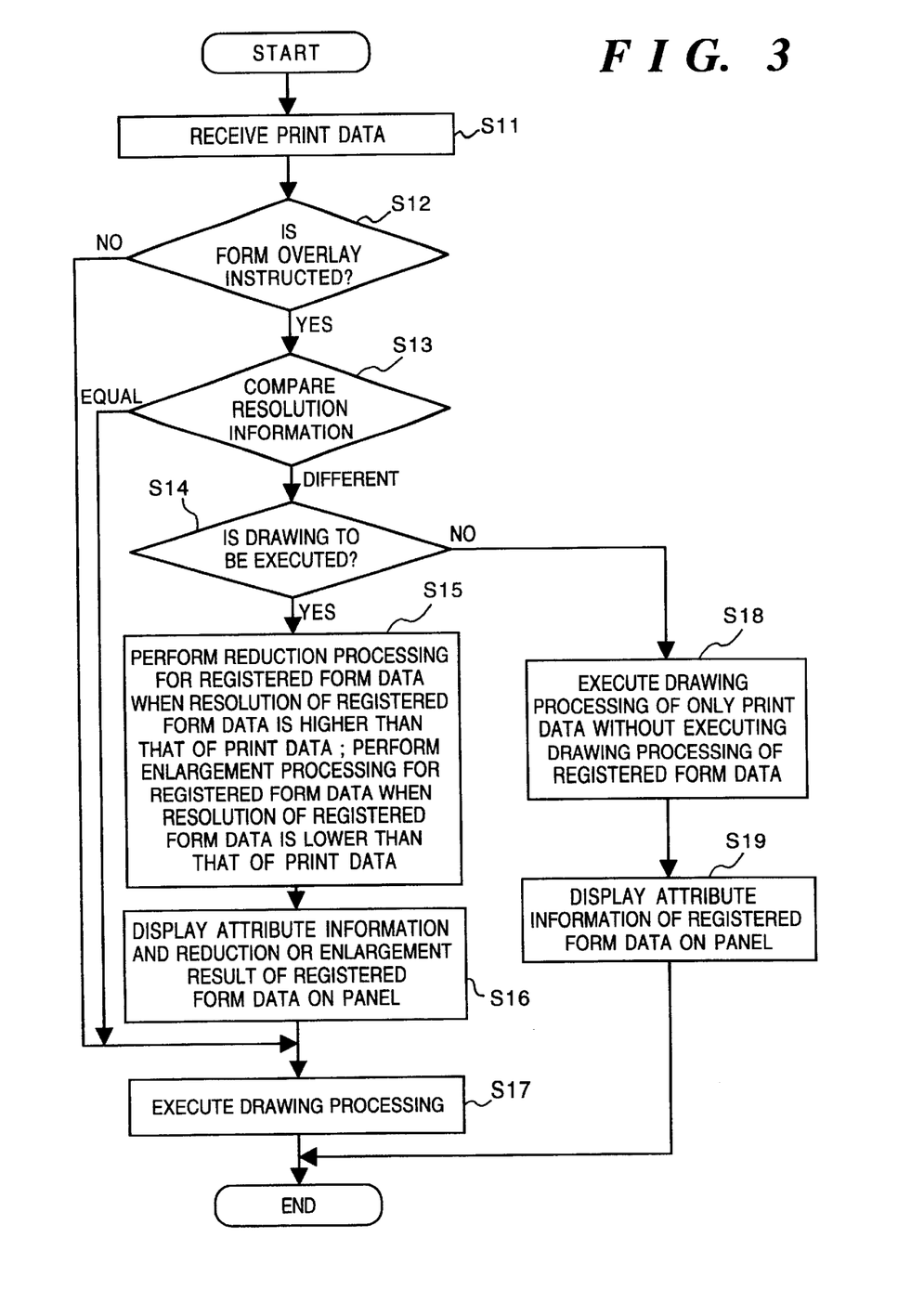
FIG. 3 is a flow chart showing the form overlay processing using form data registered in the processing shown in FIG. 2.

FIG. 3 is a flow chart showing the form overlay print processing using the registered form data.

Upon reception of print data from the host computer 101 in step S11, the flow advances to step S12 to check if the received print data instructs the form overlay print operation. If NO in step S12, the flow jumps to step S17. In step S17, the command of the print data is analyzed by the command analysis unit 104, and the print data is developed into intermediate data by the drawing data generation unit 105. The intermediate data is converted into raster data (image data) by the rasterize processing unit 106, and the raster data is stored in the band raster memory 114. The stored data is transferred from the engine transfer unit 110 to the engine unit 117, and is subjected to a print operation.

On the other hand, if it is determined in step S12 that the form overlay print operation is instructed, the flow advances to step S13, and the resolution of the registered form data designated by the form overlay print operation is compared with that of the received print data. If the two resolutions are equal to each other, the flow jumps to step S17. In step S17, image data is generated by synthesizing images of the registered form data and the received print data, and is transferred from the engine transfer unit 110 to the engine unit 117, thus executing a print operation.

On the other hand, if it is determined in step S13 that the resolution of the registered form data is different from that of the received print data, the flow advances to step S14 to check if drawing of form data designated by the form overlay print operation is to be executed. If NO in step S14, the flow advances to step S18, and drawing data is generated only for the print data and is printed, without performing drawing processing of the registered form data. In step S19, the attribute information of the registered form data is displayed on the display unit of the operation panel 118.

Note that the decision step S14 may be performed as follows. For example, in step S13, a message indicating that the resolution of the form data registered in this printer apparatus is different from that of the received print data may be transmitted to the host computer 101, and the user of the host computer 101 may determine based on the message that the form overlay print operation is not necessary. Alternatively, the message indicating the resolution difference may be displayed on the display unit of the operation panel 118, and the decision may be made based on an instruction (by using the operation panel 118) from the operator of the printer apparatus.

On the other hand, if it is determined in step S14 that drawing of the registered form data is to be executed, the flow advances to step S15. In this case, if it is determined in step S13 that the resolution of the registered form data is higher than that of the received print data, reduction processing is performed on the registered form data in step S15. On the contrary, if the resolution of the registered form data is lower than that of the received print data, enlargement processing is performed for the registered form data in step S15. Such resolution conversion processing is executed by the resolution conversion unit 108, and the conversion result is stored in the degrade raster memory 115. Note that this processing may be executed by a program stored in the ROM 103. The flow then advances to step S16, and the attribute information and the reduction or enlargement result of the registered form data are displayed on the display unit of the operation panel 118. The flow advances to step S17, and the print image of the registered form data stored in the degrade band raster memory 115 is synthesized with the received print data, thus executing the drawing processing.

Further, the reduction processing means that image data is formed by reduction data, when the registered form data (intermediate data) is converted into image data. The enlargement processing means that image data is formed by enlarging data, when the registered form data (intermediate data) is converted into image data.

[Second Embodiment]

The second embodiment of the present invention will be described below with reference to the flow charts shown in FIGS. 4 and 5. Note that the arrangement of the printer apparatus of the second embodiment is the same as that shown in FIG. 1, and a detailed description thereof will be omitted.

Figure 4:
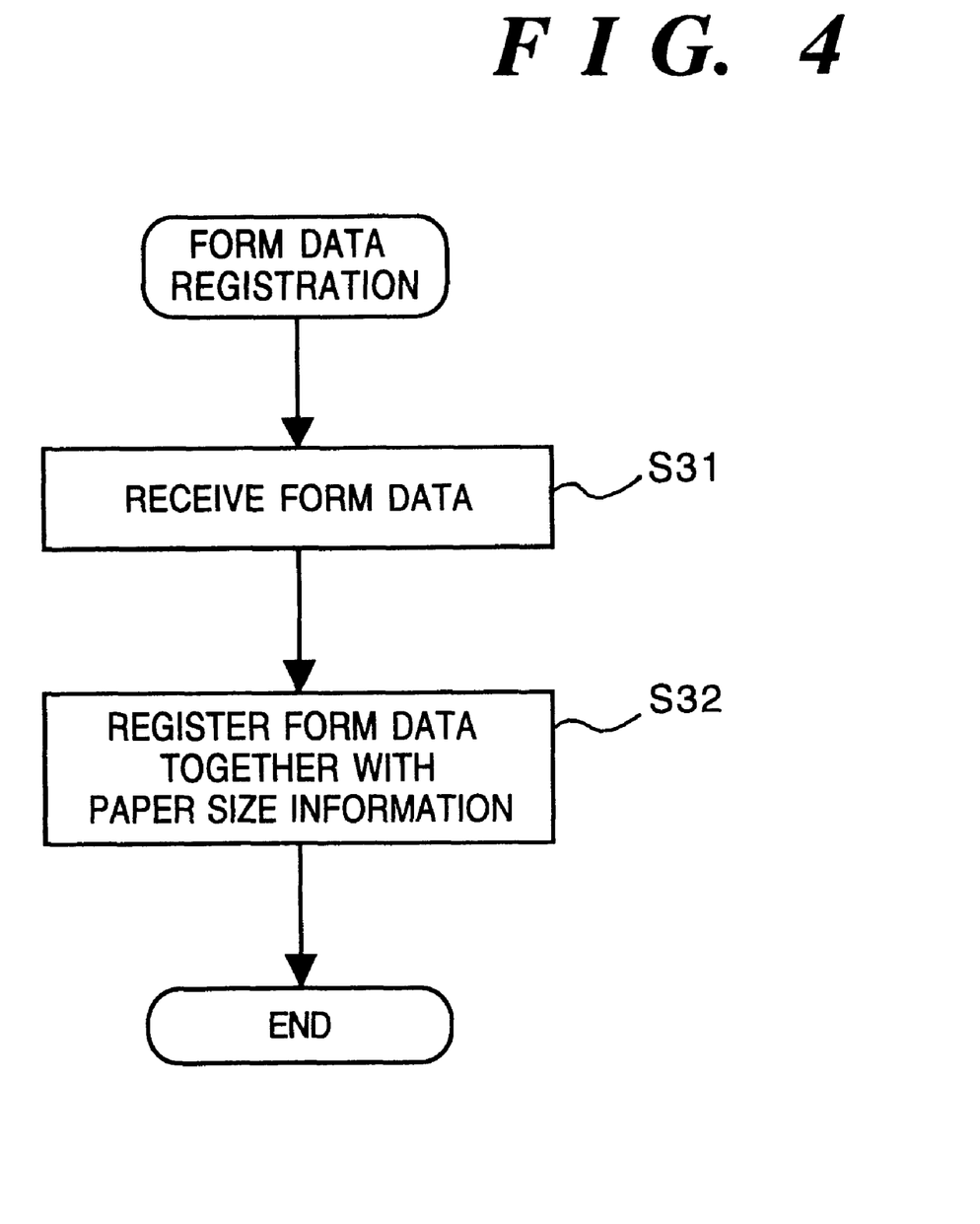
FIG. 4 is a flow chart showing the processing for registering form data from a host computer to a printer apparatus in the second embodiment of the present invention.

FIG. 4 is a flow chart showing the processing for registering form data received from the host computer. Upon reception of form data from the host computer 101 in step S31, the flow advances to step S32, and the form data is transformed into intermediate data and registered in the registration drawing memory 113 together with paper size information corresponding to the form data.

Figure 5:
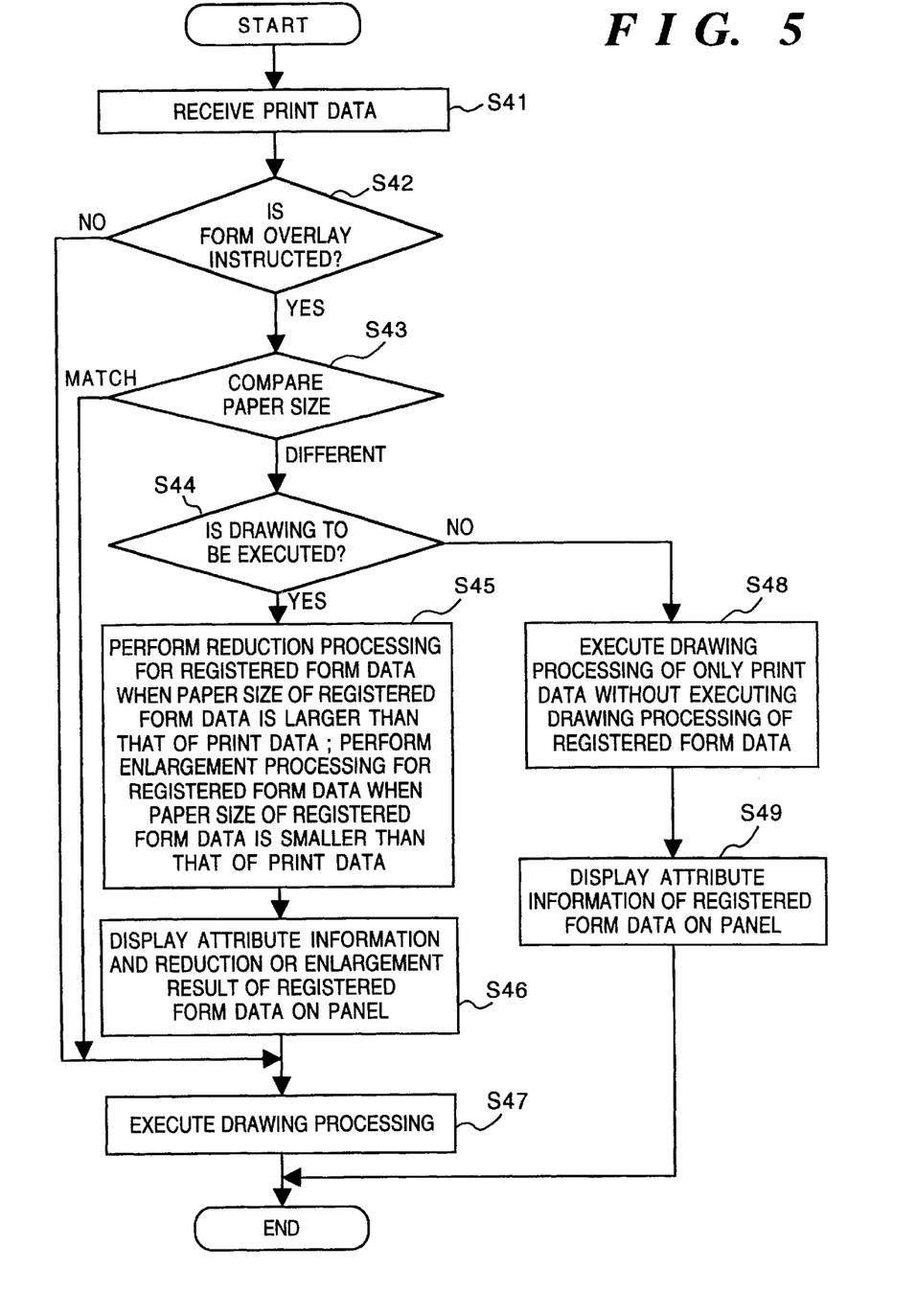
FIG. 5 is a flow chart showing the form overlay processing using form data registered in the processing shown in FIG. 4.

FIG. 5 is a flow chart showing the form overlay print processing using the registered form data (intermediate data).

Upon reception of print data from the host computer 101 in step S41, the flow advances to step S42 to check if the received print data instructs the form overlay print operation. If NO in step S42, the flow jumps to step S47. In step S47, the command of the print data is analyzed by the command analysis unit 104, and the print data is transformed into intermediate data by the drawing data generation unit 105. The intermediate data is converted into raster data (image data) by the rasterize processing unit 106, and the image data is stored in the band raster memory 114. The stored image data is transferred from the engine transfer unit 110 to the engine unit 117, and is subjected to a print operation.

On the other hand, if it is determined in step S42 that the form overlay print operation is instructed, the flow advances to step S43, and the paper size of the registered form data designated by the form overlay print operation is compared with that instructed by the received print data. If the two paper sizes are equal to each other, the flow jumps to step S47. In step S47, image data is generated by synthesizing images of the registered form data and the received print data, and is transferred from the engine transfer unit 110 to the engine unit 117, thus executing a print operation.

On the other hand, if it is determined in step S43 that the paper size of the registered form data is different from that of the received print data, the flow advances to step S44 to check if drawing of form data is to be executed. If NO in step S44, the flow advances to step S48, and image data is generated only for the print data and is printed, without performing drawing processing of the registered form data. In step S49, the attribute information of the registered form data is displayed on the display unit of the operation panel 118.

Note that the decision step S44 may be performed as follows. For example, in step S43, a message indicating that the paper size of the form data (intermediate data) registered in this printer apparatus is different from that of the received print data may be transmitted to the host computer 101, and the user of the host computer 101 may determine based on the message that the form overlay print operation is not necessary. Alternatively, the message indicating the paper size difference may be displayed on the display unit of the operation panel 118, and the decision may be made based on an instruction from the operator of the printer apparatus.

On the other hand, if it is determined in step S44 that drawing of the registered form data is to be executed, the flow advances to step S45. In this case, if it is determined in step S43 that the paper size of the registered form data is larger than that of the received print data, reduction processing is performed on the registered form data in step S45. On the contrary, if the paper size of the registered form data is smaller than that of the received print data, enlargement processing is performed on the registered form data in step S45. The flow then advances to step S46, and the attribute information and the reduction or enlargement result of the registered form data are displayed on the display unit of the operation panel 118. The flow advances to step S47, and the drawing processing of the registered form data and the received print data is executed. Further, the reduction processing and the enlargement processing are the same as above-described.

In the above-mentioned embodiments, the printer apparatus comprises a laser beam printer. However, the present invention is not limited to this. For example, the present invention may be applied to an ink-jet printer, a dot-matrix printer, a thermal transfer printer (including a sublimation type printer), an LED printer, a liquid crystal shutter printer, and the like.

Further, in step S15 in FIG. 3 or step S45 in FIG. 5, the intermediate data of form data can be regenerated according to the resolution or size of the print data, and the regenerated results can be displayed in step S16 in FIG. 3 or in step S46 in FIG. 5.

In the above-mentioned embodiments, the drawing memory 112 comprises a RAM, but may comprise an NVRAM.

Furthermore, in the above-mentioned embodiments, data to be registered is form data. Alternatively, other data such as font data, macro data, or the like may be registered.

When the attribute information of the registered form data is different from that of print data, a message indicating this is displayed on the operation panel 118. Alternatively, such a message may be supplied to the host computer 101, and may be displayed as a warning message on the display of the host computer 101.

Furthermore, after the message indicating that the attribute information of the registered form data is different from that of print data is supplied to the host computer, the user of the host computer may appropriately select whether or not the registered form data is to be drawn.

Note that the present invention may be applied to either a system constituted by a plurality of pieces of equipment (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the program code read out from the storage medium and stored in the RAM 112 by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function expansion board or a function expansion unit, which is inserted in or connected to the computer and receives the program code read out from the storage medium.

Figure 6:
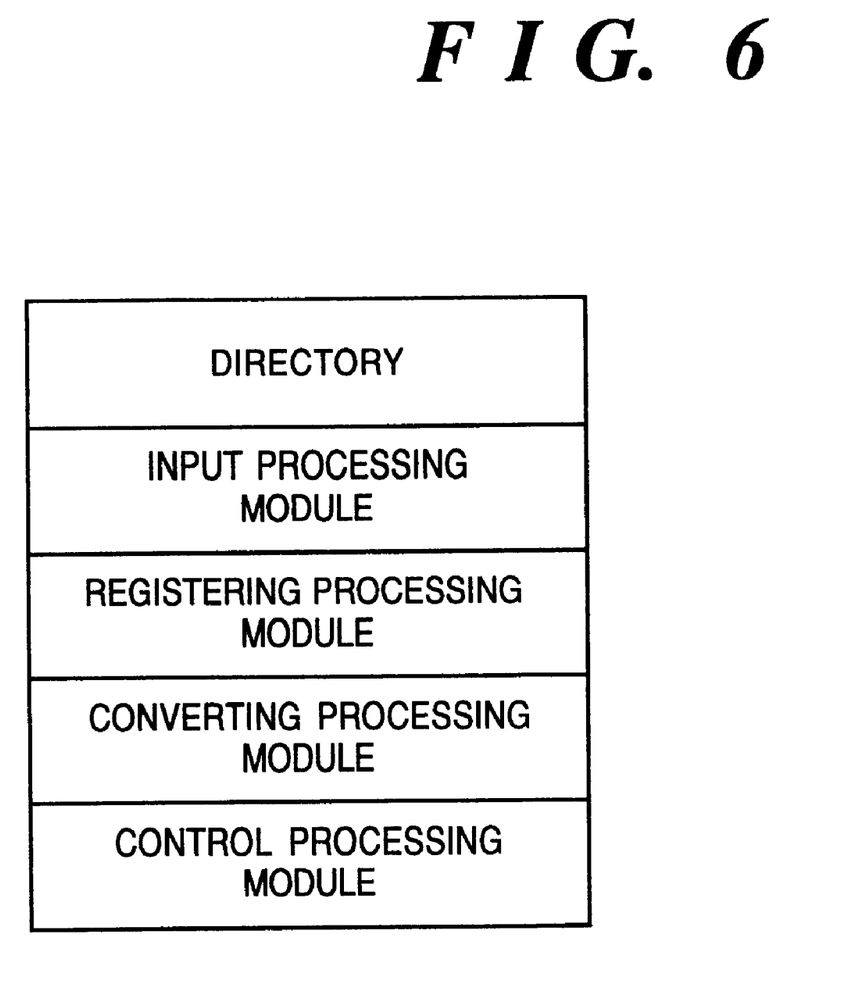
FIG. 6 illustrates program modules stored in a storage medium according to the present invention.

When the present invention is applied to the above-mentioned storage medium, the storage medium stores the program codes corresponding to the above-mentioned flow charts. That is, the program modules shown in FIG. 6 are stored in the storage medium. More specifically, the program codes that realize at least the following function modules, i.e., "inputting procedure module", "registering procedure module", "converting procedure module", and "control procedure module" can be stored in the storage medium.

As described above, according to the above embodiments, when the attribute information is resolution or paper size information, and the resolution or paper size information of registration data does not match that of a body of print data, the registration data can be enlarged or reduced, and the form overlay print operation can be performed.

Further, the registered intermediate data of form data is regenerated in accordance with input print data, the print data is printed using the regenerated intermediate data.

According to the above embodiments, since the amount of data to be registered is not associated with the resolution or the like of the print data, the registration data of the form data, or the like can be more effectively used.

According to the above embodiments, the memory area required for registering the registration data can be reduced.

The present invention is not limited to the above embodiments and various changes and modifications can be made within the spirit and scope of the present invention. Therefore, to apprise the public of the scope of the present invention, the following claims are made.

What is claimed is:

1. A print control apparatus for controlling a form overlay print of form data and print data, comprising:

registration means for registering form data and first attribute information indicating a resolution of the respective form data;

comparison means for, in a case where a print operation of print data using the form data registered by said registration means is designated, comparing the first attribute information with a resolution of second attribute information indicating a resolution of the print data;

notification means for notifying that the resolution of the form data and the resolution of the print data are different from each other, in a case where said comparison means detects that the first and second attribute information do not match; and print control means for controlling to process the form overlay print of the form data and the print data in accordance with an input designation, in response to a notification by said notification means.

2. The apparatus according to claim 1, wherein said print control means generates output data by overlaying the print data on the form data, and controls to print the output data.

3. The apparatus according to claim 2, wherein said print control means outputs the output data to a printer engine.

4. The apparatus according to claim 1, further comprising generation means for generating image data of the form data based on the second attribute information, in a case where said comparison means detects that the first and second attribute information do not match.

5. The apparatus according to claim 4, wherein said generation means performs a rasterizing processing on intermediate data which is obtained by transforming the form data.

6. The apparatus according to claim 1, wherein said notification means notifies a host computer which has sent the print data.

7. The apparatus according to claim 1, wherein said notification means notifies a user by using an operational panel.

8. The apparatus according to claim 1, further comprising determination means for determining whether or not to perform a form overlay processing on the basis of the input designation in response to a notification by said notification means, wherein said print control means generates the output data without performing the form overlay processing, in a case where said determination means determines not to perform the form overlay processing.

9. A method for controlling a form overlay print of form data and print data, comprising the steps of:

registering form data and first attribute information indicating a resolution of the respective form data;

comparing, in a case where a print operation of print data using the form data registered by said registration means is designated, the first attribute information with a resolution of second attribute information indicating a resolution of the print data;

notifying that the resolution of the form data and the resolution of the print data are different from each other, in a case where said comparison means detects that the first and second attribute information do not match; and controlling to process the form overlay print of the form data and the print data in accordance with an input designation, in response to a notification by said notification means.

10. The method according to claim 9, wherein the output data is generated by overlaying the print data on the form data, and the output data is printed.

11. The method according to claim 10, wherein the output data is output to a printer engine.

12. The method according to claim 9, further comprising a generating step for generating image data of the form data based on the second attribute information, in a case where the comparing step detects that the first and second attribute information do not match.

13. The method according to claim 12, wherein a rasterizing processing is performed on intermediate data which is obtained by transforming the form data.

14. The method according to claim 9, wherein a host computer which has sent the print data is notified in the notifying step.

15. The method according to claim 9, wherein a user is notified in the notifying step by using an operational panel.

16. The method according to claim 9, further comprising a determining step for determining whether or not to perform a form overlay processing on the basis of the input designation in response to a notification performed in said notifying step, wherein the output data is generated without performing the form overlay processing, in a case where the determining step determines not to perform the form overlay processing.

17. A computer-readable medium which stores computer-executable process steps, the computer-executable process steps for controlling a form overlay print of form data and print data, the computer-executable steps comprising:

registering form data and first attribute information indicating a resolution of the respective form data;

comparing, in a case where a print operation of print data using the form data registered by said registration means is designated, the first attribute information with a resolution of second attribute information indicating a resolution of the print data;

notifying that the resolution of the form data and the resolution of the print data are different from each other, in a case where said comparison means detects that the first and second attribute information do not match; and controlling to process the form overlay print of the form data and the print data in accordance with an input designation, in response to a notification by said notification means.

18. A computer-readable medium according to claim 17, wherein the output data is generated by overlaying the print data on the form data, and the output data is printed.

19. A computer-readable medium according to claim 18, wherein the output data is output to a printer engine.

20. A computer-readable medium according to claim 17, wherein said computer-executable process steps further comprise a generating step for generating image data of the form data based on the second attribute information, in a case where said comparing step detects that the first and second attribute information do not match.

21. A computer-readable medium according to claim 20, wherein a rasterizing processing is performed on intermediate data which is obtained by transforming the form data.

22. A computer-readable medium according to claim 17, wherein a host computer which has sent the print data is notified in the notifying step.

23. A computer-readable medium according to claim 17, wherein a user is notified in the notifying step by using an operational panel.

24. A computer-readable medium according to claim 17, wherein the computer-executable process steps further comprise a determining step for determining whether or not to perform a form overlay processing on the basis of the input designation in response to a notification performed in said notifying step, wherein the output data is generated without performing the form overlay processing, in a case where the determining step determines not to perform the form overlay processing.

* * * * *